Figure 1:
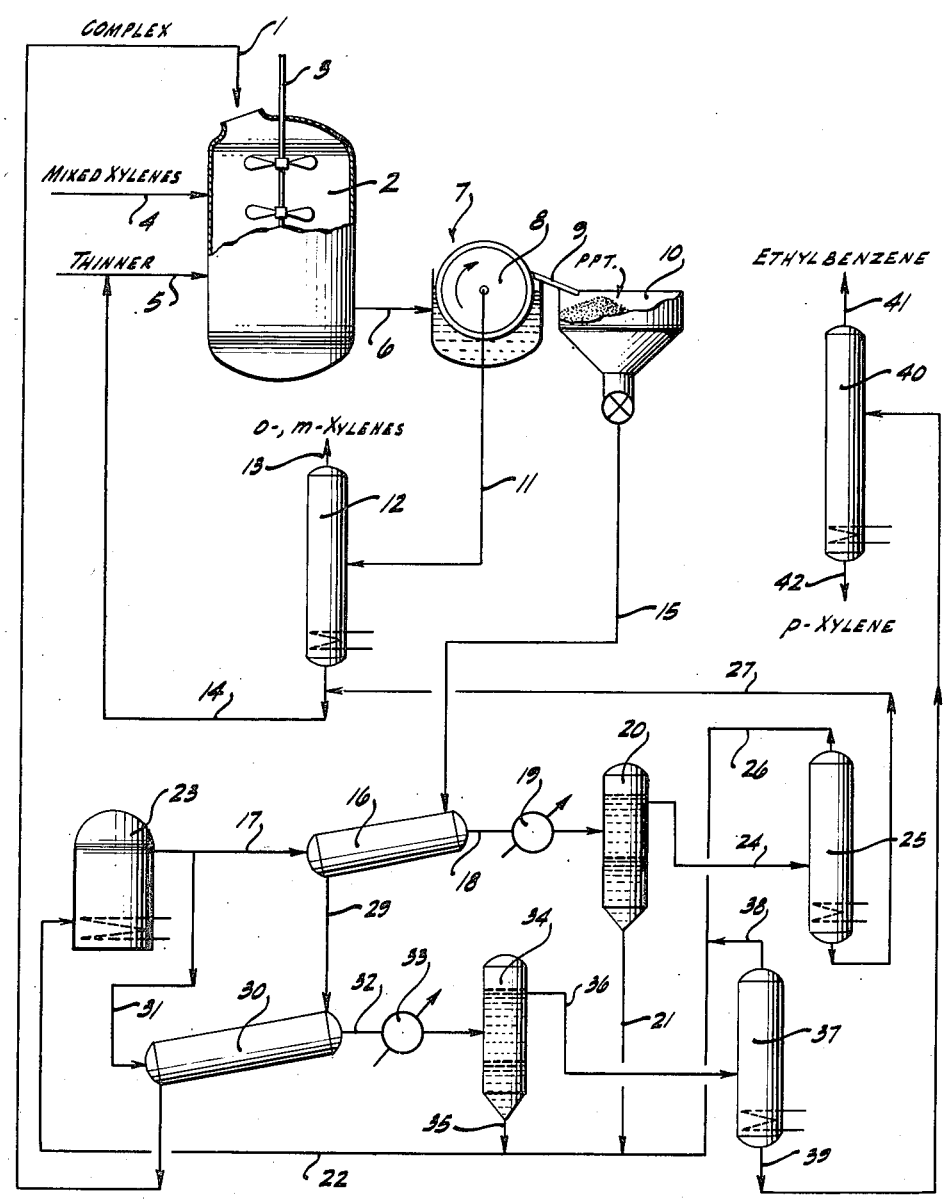

July 2, 1957 W. D. SCHAEFFER ET AL 2,798,102
METHOD OF DECOMPOSING WERNER COMPLEX CLATHRATES
Filed Oct. 25, 1952 2 Sheets-Sheet 1

INVENTORS,
WILLIAM D. SCHAEFFER,
W. SMITH DORSEY,
BY
Lannas S. Henderson
AGENT.

2,798,102

METHOD OF DECOMPOSING WERNER COMPLEX CLATHRATES

William D. Schaeffer, Ontario, and William Smith Dorsey, Fullerton, Calif., assignors to Union Oil Company of California, Los Angeles, Calif., a corporation of California Application October 25, 1952, Serial No. 316,886

17 Claims. (Cl. 260—674)

This invention relates to methods for separating organic compounds which differ in molecular configuration, particularly compounds which have similar chemical and physical properties, and are therefore difficultly separable by conventional methods such as fractional distillation or crystallization. Broadly stated, the method consists in selectively absorbing or "clathrating" one or more components of the feed mixture into a solid Werner-type complex of a metal salt and a basic nitrogen compound, and thereafter recovering the absorbed component from the clathrate by stripping with steam or other entraining agent. Present experimental evidence points toward the theory that those compounds whose molecular configurations most nearly coincide with the crystal-lattice voids of the Werner complex are selectively absorbed therein, forming what is regarded as a "clathrate" type compound. The present invention is based particularly upon certain improved procedures for recovering the absorbed phase from the clathrate by stripping with steam or other entraining agents.

A copending application of William D. Schaeffer, Serial No. 274,647, filed March 3, 1952, now abandoned, of which this application is a continuation-in-part, discloses generally certain basic separation procedures by selective absorption, or extractive crystallization, in Werner complexes, and also the recovery of absorbed components from the clathrates by steam-stripping. It has now been found however that steam-stripping, or vapor-stripping in general, tends to decompose those Werner complexes which contain volatile nitrogen bases. It has also been found that the solid clathrates, as recovered from the selective absorption step, ordinarily contain, in addition to the truly absorbed or clathrated component, an interstitial liquid phase adhering by adsorption and/or capillarity to the surface of the solid clathrate crystals. This interstitial phase may consist primarily of solvent or diluent used in the absorption step, and/or part of the lean feed-mixture, but in any event is relatively lean in those components of the feed mixture which are selectively absorbed into the complex by clathrating. Single stage steam stripping is found to remove both the absorbed and the interstitial phases from the clathrate, thereby diluting the absorbed phase with undesired contaminants from the interstitial phase.

It has now been found that the undesirable decomposition of the Werner complex during vapor-stripping may be overcome by including in the entrainer an equilibrium proportion of the nitrogen base component of the complex, and recovering and utilizing the entrainer-nitrogen-base mixture in a continuous cycle, with cyclic removal therefrom of the components stripped from the clathrate. It has further been found that this entrainer-nitrogen-base mixture may advantageously be employed in a plurality of stripping stages, and that the interstitial liquid phase on the clathrate is preferentially removed in the first stripping stages, while the clathrated phase is removed only upon more severe or prolonged stripping operations. This phenomenon clearly implies that there is a latent heat of formation for the clathrate compounds, while there is little or no inter-molecular attraction between the complex and the interstitial phase. The interstitial phase adheres to the clathrate by virtue of such physical forces as surface tension, capillarity or adsorption. It is therefore possible to preferentially strip the interstitial phase from the surface of the clathrates even though some of the components thereof may boil considerably higher than the clathrated components. This possibility is of considerable practical value when a high-boiling solvent or diluent is used to facilitate the mechanics of the selective absorption step.

According to another modification of the invention, the interstitial phase may be selectively displaced by washing with a solvent which is more readily separable from the clathrated phase than was the original interstitial phase, and the washed clathrate then stripped of both the absorbed phase and the interstitial phase in a single stripping stage. The combined phases may then be separated by such conventional methods as fractional distillation, etc.

From the above, it will be seen that one of the principal objects of this invention is to provide methods for recovering absorbed components from clathrates thereof with Werner complexes, without decomposing the Werner complex to any significant extent.

Another object is to provide methods for separating the interstitial phases from the absorbed phase of the clathrates described herein.

A still further object is to provide efficient and economical methods for recovering the absorbed phase of Werner complex cathrates by vapor stripping.

Other objects will be apparent to those skilled in the art from the description which follows.

The present invention is based upon the broad discovery that certain crystalline metal complexes of the Werner type are capable of selectively absorbing or clathrating, either during or after formation of their crystalline structure, certain organic compounds, while other organic compounds of similar gross physical properties are absorbed to a much smaller extent, or not at all. The theoretical explanation for this phenomenon is not known with certainty, but present information indicates that a "clathrate" type compound is formed with the absorbed organic compounds. These clathrates, when formed in the presence of an excess of pure absorbable compound at any given temperature, are found to contain the absorbed component in a constant proportion or combining ratio, wherein, however, such combining ratio is not necessarily that of any small integers. Present evidence indicates that the absorbed component is occluded within the voids of the crystal lattice, and the selectivity of absorption implies that there is an optimum molecular configuration of absorbate for maximum absorption in a particular crystal lattice. In the present case, the Werner complexes employed are found to favor, for the most part, the absorption of para-compounds over the ortho- or meta-isomers. However, by suitably modifying the constituents of the Werner complex employed, this order may be reversed so that meta- and ortho-compounds may be selectively absorbed in preference to the para-isomers.

The methods described herein are particularly valuable for separating aromatic hydrocarbon isomers. Such isomers for example as meta- and para-xylene are especially difficult to separate by conventional methods. The boiling points of these compounds are very nearly the same, and separation by fractional distillation is therefore not practical, nor do their azeotropes display a sufficient difference in boiling point to permit effective fractionation. Some degree of resolution may be obtained by fractional crystallization, but repeated crystallizations are necessary, with correspondingly low yields, in order to obtain any one of the components in reasonably pure form. Obviously also, the chemical properties of such isomers are so nearly identical as to render separation by conventional chemical procedures very difficult. Moreover, most of the heretofore proposed chemical separation processes, such as selective sulfonation, are inherently uneconomical.

In using Werner complexes containing gamma-picoline, or other low-boiling nitrogen bases, to separate xylenes it is found that heating or steam distillation to recover the absorbed p-xylene therefrom causes considerable volatilization and loss of nitrogen base. These nitrogen bases are rather loosely held by the complex, and elevated temperatures tend to cause some vaporization thereof. In the present case this disadvantage is overcome by stripping the absorbed p-xylene from the clathrate with vapors of an entrainer containing approximately an equilibrium proportion of the nitrogen base.

Two general methods may be employed in performing the herein described separations by selective absorption. The first consists in merely contacting and agitating a solid Werner complex with the feed mixture. In this method, it may be desirable in some cases to dilute the feed mixture with a solvent or thinner which is not a solvent for the Werner complex in order to facilitate the agitation and handleability of the mixture. Hydrocarbon solvents are preferred for this purpose. In other cases the feed mixture may be sufficiently lean in the component which is to be absorbed in clathrate-form that an extraneous solvent is unnecessary. In either case it is usually desirable that sufficient fluid be present to form a slurry which may be easily stirred, as with a propeller, or in a colloid mill. If no solvent is employed, the solid clathrate which is filtered from the lean feed residue will contain an interstitial phase composed primarily of lean feed residue. If a solvent is employed, the interstitial phase will consist of solvent plus lean feed residue.

The second general method of performing the selective absorption step consists in dissolving a Werner complex in a solvent such as propylene glycol, methyl Cellosolve, or chloroform, adding the feed mixture, and then altering the physical environment of the whole mixture, as by cooling, in such manner as to precipitate the Werner complex. In preciptating, the complex selectively absorbs one or more components of the feed mixture, thereby forming a clathrate. As recovered by filtration, the clathrate contains an interstitial phase consisting of solvent plus lean feed mixture.

It is now found that the interstitial phases resulting from any of the above absorption methods may be effectively removed in preference to the clathrated phase by steam or vapor stripping; or in other words that the clathrated phase is held sufficiently firmly in the complex to permit the preferential thermal removal of even higher boiling compounds from the surfaces and interstices of the clathrate crystals. It is also found that liquids in which the feed mixture, the thinner, or the solvent for the Werner complex are soluble, but in which the Werner complex is insoluble, will selectively displace the interstitial phase in preference to the clathrated phase. This is of importance when the thinner or Werner complex solvent is extremely high boiling, and it is hence desirable to replace it with a lower-boiling phase which may be thermally dissociated from the clathrate with greater ease and selectivity, and with a minimum of decomposition of the complex. Also, by the use of such a wash solvent boiling sufficiently apart from the feed mixture, it is possible to render the interstitial phase almost totally devoid of lean feed mixture, and hence avoid the necessity for a preliminary stripping stage, both the interstitial phase and clathrated phase being removed in a single stripping stage, and thereafter separated by fractional distillation. These various methods for recovery will be more particularly explained hereinafter in reference to the accompanying Figures 1 and 2.

The Werner-type complexes employed herein are made up of at least three components. The fundamental unit is a metal having an atomic number above 12 which is capable of forming coordinate complexes of the Werner type. This includes primarily the metals of groups IB, IIB, VIB, VIIB, and VIII of the periodic table, such for example as iron, cobalt, nickel, copper, zinc, cadmium, silver, manganese, chromium, mercury, and molybdenum. Aluminum may also be used in some instances.

The second component consists of one or more basic nitrogen compounds which are bound to the central metal atom through coordinate bonds. The complexes are mainly of the tetra- and hexa-coordinate types, wherein the metal atom is combined with four or six molecules of the basic nitrogen compound to form a positive radical which is usually divalent. Examples of suitable nitrogen compounds are set forth hereinbelow.

The positive radical is in turn combined with a suitable negative radical, such for example as thiocyanate NCS—, isothiocyanate SCN—, azide NNN—, cyanate NCO—, isocyanate OCN—, cyanide CN—, sulfate $SO_4=$, nitrate $NO_3$—, nitro $NO_2$—, nitrite ONO—, chloride Cl—, bromide Br—, iodide I—, phosphate $PO_4\equiv$. A group of negative radicals found to be particularly effective for the present purposes consists of the monovalent radicals thiocyanate, isothiocyanate, azide, cyanate, isocyanate and cyanide. However, any radical may be utilized which is capable of producing a crystalline complex with the above positive radical, which complex will exhibit the desired selectivity for the particular isomer or compound which is to be absorbed. Such complexes are described generally in Modern Aspects of Inorganic Chemistry, Emeleus and Anderson, 79–178, Van Nostrand Co., 1946, and also in Textbook of Inorganic Chemistry, vol. X, M. M. J. Sutherland, J. P. Lippincott Co., 1928. These references also describe general methods which may be employed for preparing the particular complexes employed herein.

The complexes concerned herein may be designated by the following general formula:

$$[X.Z_y.A_n] \qquad (I)$$

wherein X is the metal atom as defined above, Z is the basic nitrogen compound, $y$ is a number from 2 to 6, A is the negative radical as above defined, and $n$ is a number from 1 to 3.

The basic nitrogen compounds employed in the above formula should be such as to give a maximum selective absorption for the particular isomer which is to be absorbed into the crystal lattice of the complex. For example, if it is desired to absorb p-xylene, a very suitable nitrogen compound is gamma-picoline. 4-ethyl pyridine is equally suitable. Not all nitrogen compounds are equally effective in forming complexes which will absorb the desired component. For example, the beta-picoline complex with nickel thiocyanate is not as effective as the gamma-picoline complex for absorbing para-xylene, presumably because of the steric effects of the 3-methyl group. However, the beta-picoline complex may be used advantageously for absorbing other compounds. Also a mixture of beta- and gamma-picoline may be employed to form a mixed-crystal form of Werner complex which is suitable for absorbing p-xylene. The nitrogen compounds should therefore be selected by a judicious combination of theoretical reasoning and actual testing of the complexes with the particular mixture to be separated. The over-all molecular dimensions of the nitrogen compound should approximate the molecular dimensions of the compound to be absorbed in the complex. Suitable nitrogen compounds for various applications include for example, mono-, di- and trialkyl amines, arylamines, mono- and di- N-substituted arylamines, aminonaphthenes, heterocyclic amines such as pyridine, substituted pyridines, pyrrole, substituted pyrroles, piperidines, polyamines such as ethylene diamine, and amines containing other non-interfering functional groups. The heterocyclic amines are a preferred class, and especially the 4-alkylpyridines.

The Werner complexes defined in Formula I above may be prepared by any of several different methods. According to one method they may be formed by precipitation from an aqueous solution. This is ordinarily accomplished by first forming in solution the desired metal salt containing the X and A components of Formula I. To this solution is then added from about two to six molar equivalents of the desired nitrogen compound Z. The insoluble complex thereupon precipitates and is removed and dried. The drying may be accomplished in a stream of air at room temperature, or slightly elevated temperatures may be employed. The substantially dry, powered or granular complex may then be employed directly in the separation techniques described herein.

Alternatively, if a solvent is used in the absorption step, the complex may be formed in situ during that step by first dissolving the desired metal salt in the solvent and then adding the desired molar ratio of the nitrogen compound. The complex so formed may remain in solution or precipitate therefrom, depending upon the nature of the solvent and its temperature.

Examples of suitable complexes which may be employed, corresponding to Formula I above, are as follows:

$[Ni(\gamma\text{ picoline})_4(SCN)_2]$ $[Cu(\gamma\text{ picoline})_4(SCN)_2]$ $[Hg(\gamma\text{ picoline})_4(NNN)_2]$ $[Ni(1\text{-hexylamine})_6(SCN)_2]$ $[Co(\text{pyridine})_4(CNO)_2]$ $[Zn(\gamma\text{ picoline})_2Cl_2]$ $[Fe(\text{imidazole})_4(SCN)_2]$ $[Fe(\text{pyrrole})_4(SCN)_2]$ $[Cd(\gamma\text{ picoline})_4(CN)_2]$ $[Zn(\text{aniline})_4(SCN)_2]$ $[Ag(\gamma\text{ picoline})_2(NNN)]$ $[Zn(\text{aniline})_4(CN)_2]$ $[Cr(\text{pyridine})_4SO_4]$ $[Fe(1\text{-hexylamine})_4(SCN)_2]$ $[Ti(\text{isoquinoline})_3(NH_3)_3(C_2O_4)_2]$ Obviously many other compounds similar to the above could be employed, not all of which would give effective or optimum separation of all isomer pairs, but which should be selected to meet the specific pecularities of the isomers concerned.

The amount of complex employed, relative to the feed mixture, depends upon its specific capacity for absorbing the particular isomer concerned, and also upon the proportion of that isomer present in the original mixture. The complexes are found in general to be capable of absorbing between about 10% to 70% by weight of absorbable compounds. Optimum efficiency may require that more or less than this "stoichiometric" amount of complex be employed, depending upon its relative capacity for other components in the mixture to be resolved, and the number of absorption cycles or stages which are permissible. In general, the amount of complex to be employed may vary between about ¼ to 20 parts by weight per part of absorbable component in the mixture. Smaller proportions of complex will generally yield a purer absorbate, while the larger proportions result in more complete removal of absorbate from the mixture, on the basis of a single-stage batch absorption.

The invention may perhaps be more readily understood by referring to the accompanying drawings.

Figure 1 is a schematic illustration of the specific method contemplated herein wherein a feed mixture consisting of mixed xylenes and ethylbenzene is contacted in an absorption stage with a solid Werner complex containing a volatile nitrogen base such as gamma-picoline, and wherein a thinner boiling higher than the nitrogen base is employed in order to facilitate the mechanics of the absorption step. The Werner complex may for example be nickel dithiocyanate-tetra-gamma-picoline, and the solvent may be tetralin, which boils at 207° C. The complex is introduced through line 1 to a mixing vessel 2 equipped with an agitator 3. The feed mixture of xylenes is introduced through line 4 and the thinner through line 5. These ingredients are then contacted with thorough agitation for any suitable period of time, for example between 2 minutes and 60 minutes, at any suitable temperature, for example between 0° and 100° C.

After a suitable contact period the resulting slurry from vessel 2 is withdrawn through line 6 and transferred to a continuous rotary filter 7. In filter 7 the solid clathrate accumulates on the filter rotor 8 and is continuously scraped therefrom by means of blade 9 and is then transferred directly to a suitable receptacle indicated as hopper 10. The filtrate from filter 7 is taken off through line 11 and transferred to a fractionating column 12 wherein the unabsorbed xylenes, consisting principally of ortho- and meta-xylenes, are taken off overhead through line 13. This overhead may then be further fractionated by conventional methods, not shown, to separate the pure xylenes, or if it still contains appreciable amounts of para-xylene it may be again contacted with the Werner complex in a second absorption stage. The bottoms from distillation column 12 consist almost entirely of thinner which is removed through line 14 and recycled to absorption vessel 2.

The moist solid in hopper 10 now consists of the clathrate of the Werner complex and para-xylene plus an interstitial phase consisting of a mixture of the thinner plus some of the lean feed mixture. This solid material is then transferred through line 15 to a preliminary rotary steam stripper 16. A mixture of steam plus equilibrium quantities of the nitrogen base present in the Werner complex is then introduced near the solids outlet end of stripper 16, via line 17. The effluent vapors from stripper 16 are removed through line 18, condensed in heat exchanger 19, and then passed into a decanter 20, wherein an aqueous phase and an organic phase stratify. The lower aqueous phase is taken off through line 21, and admitted to recycle line 22 from which it flows into a suitable vapor generator 23 to provide stripping vapors for strippers 16 and 30.

The upper organic phase in decanter 20 is passed via line 24 to a distillation column 25. In this column an overhead is separated consisting predominantly of azeotropic mixtures of the nitrogen base with small quantities of water and xylenes. This overhead is small in volume compared to the total volume of the aqueous phase in decanter 20 and hence the xylene content of the overhead does not build up, and the whole may be conveniently recycled to vapor generator 23 through lines 26 and 22. The bottoms from distillation column 25 consist predominantly of thinner plus a mixture of xylenes, the isomer ratio of which is similar to that of the feed mixture, and hence is preferably recycled through line 27 to line 14 and thence to vessel 2. The contact time in steam stripper 16 should be so adjusted as to remove substantially all of the interstitial liquids without removing appreciable amounts of the clathrated xylene. Suitable contact times for example may range between about 0.5 and 5 minutes and steam to hydrocarbon ratios between about 0.5 and 5. However, other times and proportions may be utilized.

The solids from stripper 16 are removed through discharge line 29 and admitted to the solids inlet end of the final steam stripper 30 which may be of substantially the same design as preliminary stripper 16. However, since the clathrated para-xylene is more firmly held by the complex than the interstitial phases, a more severe or prolonged stripping operation is required in order to remove substantially all of the para-xylene. Suitable contact times at, for example 100° C. are from about 4 minutes to 30 minutes, and steam to xylene ratios between about 1 and 10. With higher temperatures, shorter contact times may be employed. The stripping may suitably be accomplished by means of the same vapor mixture employed in stripper 16. These vapors from generator 23 are admitted to the solids discharge end of stripper 30 through line 31. Exit vapors from stripper 30 are passed via line 32 to condenser 33 and the condensed liquids are passed into decanter 34. Here again an aqueous and an organic phase separate. The lower aqueous phase is taken off through line 35 and recycled to vapor generator 23 via line 22. The supernatant organic phase is removed through line 36 and transferred to a distillation column 37. The overhead from distillation column 37 consists of an azeotropic mixture of the nitrogen base, water and xylenes which is similar in composition to the overhead from column 25. This overhead is therefore recycled through line 38 and line 22 to vapor generator 23.

The bottoms from distillation column 37 now consist predominantly of the desired para-xylene and ethylbenzene. This mixture may be separated by methods which are now known to the art, for example fractional crystallization, azeotropic distillation, fractional distillation, etc. In the case herein illustrated, this mixture is taken off through line 39 and transferred to an efficient distillation column 40 where the ethylbenzene is removed as overhead through line 41, and the para-xylene as bottoms through line 42. The para-xylene obtained may be of substantially any desired purity; no difficulty is ordinarily encountered in obtaining 95% to 100% pure p-xylene from a single absorption stage in yields from about 30% to 90%. Obviously however, if it is desired to improve the yield additional absorption stages may be employed. To further illustrate the results obtainable by this mode of operation the following example is cited which should not however be considered as limiting in scope.

EXAMPLE I

About 1,000 pounds of mixed xylenes having the composition listed in Table 1 is admixed in a suitable mixing vessel with 1080 pounds of a liquid thinner consisting essentially of tetralin, and 1500 pounds of the Werner complex, nickel dithiocyanate tetra-gamma-picoline. The mixture is agitated at room temperature for about 20 minutes. The resulting slurry is filtered as described above and the filtrate is distilled to recover para-xylene-lean overhead and a bottoms consisting essentially of thinner. The precipitate is vapor stripped in two stages as above described with 2 minutes' contact time in the first stage and 5 minutes' contact in the second stage. The gaseous effluents from each stripping stage are then condensed, phase-separated and fractionated as above described. The results are as shown in the following table:

*Table 1*

| Process Stage, Fig. 1 | Pounds of— | | | | | | | |
|---|---|---|---|---|---|---|---|---|
| | p-xylene | m-xylene | o-xylene | Ethyl-benzene | Thinner | Gamma Picoline | Water | Total Solids |
| Mixing Vessel 2: | | | | | | | | |
| Feed xylenes | 180 | 550 | 140 | 130 | | | | 1,500 |
| Complex | | | | | | 1,080 | | |
| Thinner | | | | | 1,080 | | | |
| Recycle (line 27) | 36 | 163 | 19 | 20 | 420 | | | |
| Dist. Column 12: | | | | | | | | |
| Overhead | 72 | 548 | 140 | 78 | | | | |
| Bottoms | | | | | | 1,080 | | |
| Stripper 16: | | | | | | | | |
| Charge— | | | | | | | | |
| Vapor | 4 | 1 | | 9 | | | 40 | 180 |
| Solids | 144 | 165 | 19 | 72 | | 420 | | | 
| | | | | | | | | 2,320 |
| Discharge— | | | | | | | | |
| Vapor | 40 | 165 | 19 | 28 | | 420 | 40 | 180 |
| Solids | 108 | 1 | | 53 | | | | |
| | | | | | | | | 1,662 |
| Dist. Column 25: | | | | | | | | |
| Overhead | 3 | 1 | | 8 | | | 32 | 10 |
| Bottoms | 36 | 163 | 19 | 20 | 420 | | | |
| Stripper 30: | | | | | | | | |
| Charge— | | | | | | | | |
| Vapor | 9 | 1 | | 12 | | | 60 | 270 |
| Solids | 108 | 1 | | 53 | | | | |
| | | | | | | | | 1,662 |
| Discharge— | | | | | | | | |
| Vapor | 117 | 2 | | 65 | | | 60 | 270 |
| Solids | | | | | | | | 1,500 |
| Dist. Column 37: | | | | | | | | |
| Overhead | 6 | | | 11 | | | 45 | 18 |
| Bottoms | 108 | 2 | | 52 | | | | 1 |
| Dist. Column 40: | | | | | | | | |
| Overhead | 1 | | | 51 | | | | |
| Bottoms | 107 | 2 | | 1 | | | | |

From the above example it will be seen that in a single contacting stage under the conditions outlined para-xylene of over 98% purity may be obtained in a yield of 59%.

Figure 2:
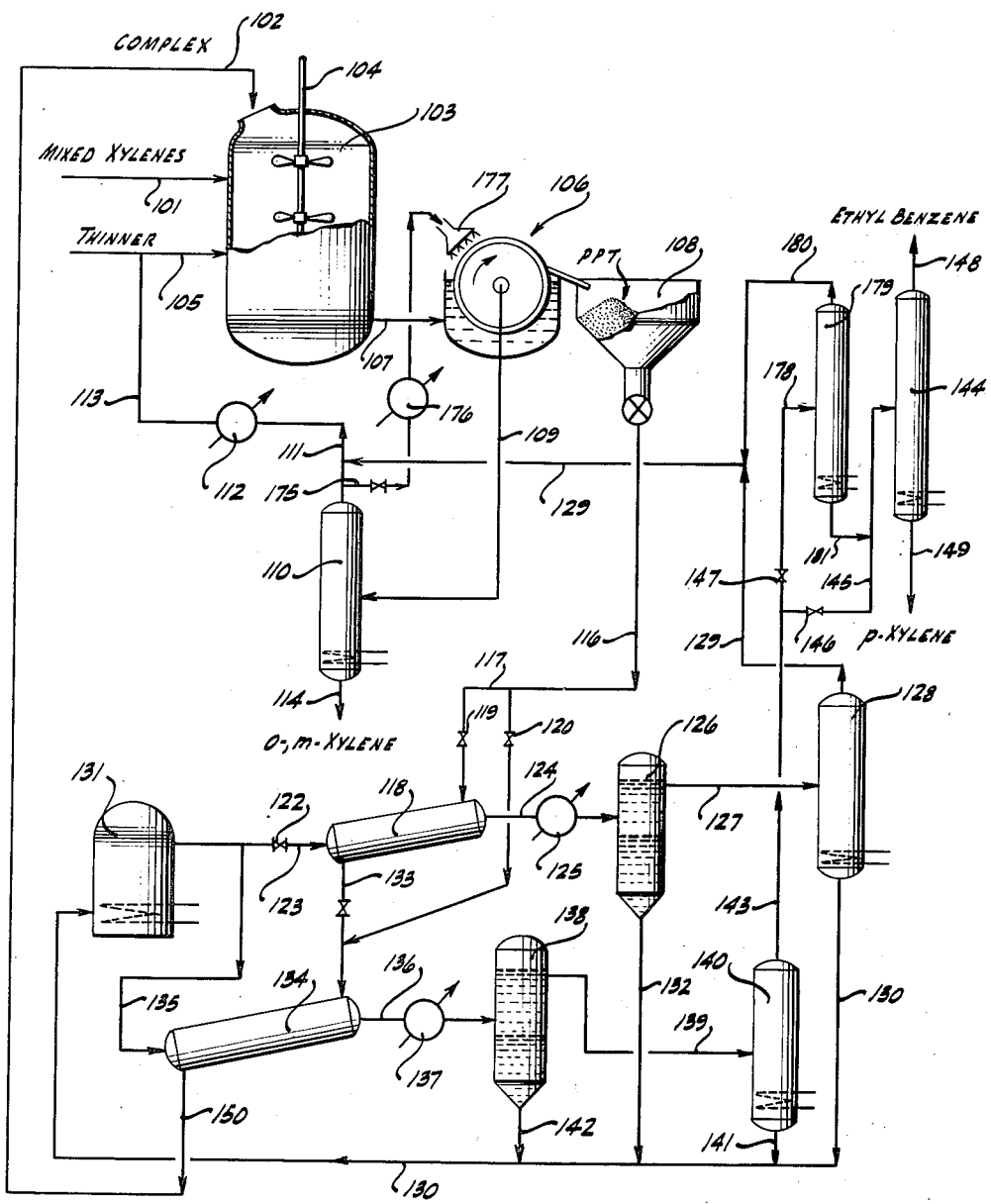

Referring now more particularly to Figure 2, this drawing is a schematic representation showing two alternative methods A and B for performing the process, in both of which the thinner employed boils at a lower temperature than the nitrogen base in the Werner complex and lower than the xylene feed mixture. Also, in both cases the nitrogen base, e. g. 4-ethyl pyridine, is chosen to boil definitely higher than the xylenes.

ALTERNATE A

In this case the mixed xylenes and the Werner complex are introduced through lines 101 and 102 respectively to mixing vessel 103 equipped with agitator 104. The thinner, which may for example consist of a paraffinic petroleum fraction boiling in the heptane range, is introduced through line 105, agitation and absorption are carried out as previously described in connection with Figure 1. The slurry from vessel 103 is transferred to filter 106 through line 107 and the solid clathrate is collected in hopper 108. The filtrate is taken off through line 109 and transferred to distillation column 110 wherein the low boiling thinner is taken off as overhead through line 111, condensed in heat exchanger 112 and recycled via line 113 to mixing vessel 103. The bottoms from distillation column 110 is removed through line 114 and consists predominantly of ortho- and meta-xylene together with some ethylbenzene and para-xylene.

The moist clathrate in hopper 108 containing absorbed para-xylene and interstitial solvent plus lean xylenes is then transferred via lines 116 and 117 to preliminary rotary stripper 118. In this case valve 119 is opened and valve 120 is closed. Due to the more volatile nature of the low boiling thinner the contact time and steamto-hydrocarbon ratio in stripper 118 may be somewhat lower than in the case of high boiling thinners. For example, contact times between 0.2 and 2 minutes and steam-to-hydrocarbon ratios between 0.3 and 2 may be employed. For this operation valve 122 is opened, thereby admitting steam through line 123 to the solids discharge end of stripper 118. The effluent vapors from stripper 118 are removed through line 124, condensed in heat exchanger 125 and transferred to decanter 126 wherein a supernatant organic phase separates consisting mainly of thinner, xylenes, and small amounts of the nitrogen base. This mixture is withdrawn through line 127 and transferred to distillation column 128 wherein the solvent plus xylenes are taken off as overhead through line 129 and recycled to mixing vessel 103 through condenser 112. The bottoms from distillation column 128, consisting mainly of nitrogen base, is removed through line 130 and recycled to a vapor generator 131. The lower aqueous phase in decanter 126, consisting mainly of water plus nitrogen base, is drawn off through line 132 and likewise recycled to vapor generator 131.

The solids from stripper 118 are removed through line 133 and admitted to the solids inlet end of final stripper 134. The vapors of stripping agent plus nitrogen base are admitted to stripper 134 from line 135. Contact times in stripper 134 may range between about 3 and 10 minutes, and the vapor-to-xylene ratio may range between about 1 and 5. Exit vapors from stripper 134 are removed via line 136, condensed in heat exchanger 137, and phase-separated in decanter 138. The upper organic phase consists mainly of para-xylene and ethylbenzene together with small amounts of the nitrogen base. This mixture is transferred through line 139 to distillation column 140. The nitrogen base bottoms from column 140 is removed through line 141 and recycled to vapor generator 131. The water-nitrogen base lower phase from decanter 138 is removed through line 142 and likewise recycled to vapor generator 131.

The overhead from column 140 consists primarily of para-xylene and ethylbenzene. This mixture is passed to distillation column 144 via line 145 by opening valve 146 and closing valve 147. In column 144, which should preferably be a fairly efficient column, corresponding for example to between 30 and 60 theoretical plates, the ethylbenzene is removed as overhead through line 148 and the para-xylene as bottoms through line 149.

By the stripping operation described in stripper 134 the clathrate of para-xylene is substantially completely broken down without loss of nitrogen base, and the stripped complex is therefore withdrawn through line 150 and recycled to mixing vessel 103.

ALTERNATE B

According to this modification the preliminary stripping step in stripper 118 is avoided by washing the clathrate on filter 106 with a quantity of pure thinner, or other solvent for the interstitial phase on the clathrate. Figure 2 shows a suitable method of operation wherein the wash solvent consists of the thinner employed in mixing vessel 103. According to this modification, a side stream of the thinner overhead from column 110 is withdrawn through line 175, condensed in auxiliary condenser 176 and transferred as a liquid to sparger 177. By employing the wash solvent at filter 106 the interstitial phase on the solid entering line 116 is rendered substantially devoid of xylenes and hence the preliminary stripper 118, as well as decanter 126 and column 128 may be omitted. To by-pass stripper 118, valve 119 is closed and valve 120 opened, thereby permitting direct entry of the washed clathrate into stripper 134, wherein stripping is accomplished as previously described in connection with the clathrate from line 133.

However, in this case the upper organic phase in decanter 138 contains the low boiling thinner in addition to para-xylene, ethylbenzene and nitrogen base. This mixture may be resolved by operating column 140 to obtain an overhead consisting of p-xylene, ethylbenzene and thinner which is transferred through lines 143 and 178 to column 179. For this purpose valve 147 is opened and valve 146 closed. The overhead from column 179 consists of the thinner which is recycled via lines 180, 129 and 113 to mixing vessel 103. The ethylbenzene-para-xylene bottoms from column 179 is then transferred through lines 181 and 145 to distillation column 144 wherein separation is accomplished as previously described.

Those skilled in the art will readily understand that various modifications in the above procedure could be made. For example, a solvent boiling higher than xylenes could be employed in a modification of Alternate B by suitably modifying the positions of overhead and bottoms in the various distillation columns.

EXAMPLE II

The procedure described under Alternate A above is carried out using "Skelly B" as the low boiling paraffin thinner (B. P. 95–105° C.), steam plus 12% 4-ethyl pyridine as the stripping agent and ferrous dithiocyanate tetra 4-ethyl pyridine [Fe(4-ethyl pyridine)$_4$(SCN)$_2$] as the Werner complex, and under the following process conditions:

Thinner/feed, wt. ratio_____ 1
Contact time, stripper 118_____Min___ 1.0
Vapor/xylene ratio, stripper 118_____ 0.5
Contact time, stripper 134_____Min___ 5.0
Vapor/xylene ratio, stripper 134_____ 2.0

The results are summarized as follows:

| | Parts by Weight | | | |
|---|---|---|---|---|
| | p-xylene | m-xylene | o-xylene | Ethylbenzene |
| Feed | 180 | 550 | 140 | 130 |
| Overhead from column 144 | 112 | 2 | | 1 |

This example shows a p-xylene recovery of about 63% at about 97.5% purity, the slight improvement in yield over Example I probably being due to the better separation of p-xylene from 4-ethyl pyridine obtainable in column 140 as a result of wider differences in boiling points.

EXAMPLE III

The procedure described in Example II is repeated, but modified in accordance with Alternate B above by washing the clathrate on the filter with part of the recycle Skelly B from the overhead of column 110, and omitting the first stripping stage at 118. The p-xylene recovery and purity is substantially the same as set forth in Example II.

By substituting other feed mixtures for the xylenes shown in the above examples, and using other Werner complexes, substantially similar separations may be achieved without decomposition of the complex, which is thus recovered in condition for recycling.

The foregoing disclosure of this invention is not to be considered as limiting since many variations may be made by those skilled in the art without departing from the scope or spirit of the following claims.

We claim:
1. A process for recovering an aromatic hydrocarbon from a solid clathrate thereof with a Werner complex, said Werner complex consisting of a salt of a metal of atomic number above 12 coordinated with about four moles of a volatile heterocyclic nitrogen base, which comprises stripping said clathrate with steam containing approximately an equilibrium proportion of said nitrogen base, recovering said aromatic hydrocarbon from the vapors thereof, and recovering as residue said Werner complex containing substantially its original mole-proportion of said nitrogen base.

2. A process as defined in claim 1 wherein the vapors from said steam stripping are condensed to form a bi-phase liquid system, and the aqueous-nitrogen base phase is vaporized and recycled to said steam stripping step.

3. A process for recovering an aromatic hydrocarbon from a solid clathrate thereof with a Werner complex, said Werner complex consisting of a salt of a metal of atomic number above 12 coordinated with about four moles of a volatile heterocyclic nitrogen base, said clathrate also containing a non-clathrated interstitial organic liquid, which comprises first subjecting said clathrate to a preliminary fluid stripping treatment to selectively remove said interstitial liquid, then recovering said aromatic hydrocarbon by stripping said clathrate with steam containing approximately an equilibrium proportion of said nitrogen base, and recovering therefrom said Werner complex containing substantially its original mole-proportion of said nitrogen base.

4. A process as defined in claim 3 wherein said preliminary fluid stripping consists of solvent washing.

5. A process as defined in claim 3 wherein said preliminary fluid stripping consists of steam stripping under conditions of temperature and duration insufficient to vaporize any appreciable portion of said clathrated aromatic hydrocarbon.

6. A process as defined in claim 3 wherein the vapors from said steam stripping are condensed to form a bi-phase liquid system, and the aqueous-nitrogen base phase is vaporized and recycled to said steam stripping step.

7. A process as defined in claim 3 wherein said Werner complex is a nickel salt coordinated with about 4 moles of a lower alkyl pyridine.

8. A process for recovering a C–8 aromatic hydrocarbon from a solid clathrate thereof with a Werner complex, said Werner complex consisting of a thiocyanate of a Group VIII metal coordinated with about four moles of a pyridine base, which comprises stripping said clathrate with steam containing approximately an equilibrium proportion of said pyridine base, recovering said hydrocarbon from the vapors thereof, and recovering as residue said Werner complex containing substantially its original mole-proportion of pyridine base.

9. In a process for separating p-xylene from a feed mixture containing at least one other C–8 aromatic isomer which comprises contacting said mixture with a Werner complex, said Werner complex consisting of a thiocyanate of a Group VIII metal coordinated with about four moles of a pyridine base, thereby forming a solid clathrate rich in p-xylene, the improved method for recovering said clathrated p-xylene which comprises selectively removing p-xylene-lean feed residue from the interstices of said clathrate by washing with a paraffinic hydrocarbon solvent, and thereafter stripping the washed clathrate with steam containing approximately an equilibrium proportion of said pyridine base, recovering p-xylene from the vapors thereof, and recovering as residue said Werner complex containing substantially its original mole-proportion of pyridine base.

10. A process as defined in claim 9 wherein said pyridine base is gamma-picoline.

11. A process as defined in claim 9 wherein said pyridine base is 4-ethyl pyridine.

12. In a process for separating p-xylene from a feed mixture containing at least one other C–8 aromatic isomer which comprises contacting said mixture with a Werner complex, said Werner complex consisting of a thiocyanate of a group VIII metal coordinated with about four moles of a pyridine base, thereby forming a solid clathrate rich in p-xylene, the improved method for recovering said clathrated p-xylene which comprises selectively removing p-xylene-lean feed residue from the interstices of said clathrate by lightly stripping with steam under conditions of temperature and duration insufficient to vaporize any appreciable portion of said clathrated p-xylene, and thereafter exhaustively stripping said clathrate with steam containing approximtely an equilibrium proportion of said pyridine base, recovering p-xylene from the vapors of said exhaustive stripping, and recovering as residue said Werner complex containing substantially its original mole-proportion of pyridine base.

13. A process as defined in claim 12 wherein said pyridine base is gamma-picoline.

14. A process as defined in claim 12 wherein said pyridine base is 4-ethyl pyridine.

15. In a process for separating p-xylene from a mixture containing at least one other C–8 aromatic isomer which comprises contacting said mixture with a Werner complex, said Werner complex being composed of a group VIII metal thiocyanate coordinated with about four moles of a 4-lower alkyl pyridine, thereby forming a solid clathrate rich in p-xylene, the improved method for recovering said clathrated p-xylene which comprises selectively removing p-xylene-lean mixture from the interstices of said clathrate by selective fluid stripping, thereafter exhaustively stripping said clathrate with steam containing approximately an equilibrium proportion of said alkyl pyridine thereby forming a vapor effluent containing p-xylene, alkyl pyridine and steam, condensing said effluent to form a bi-phase liquid system, separating the resulting aqueous-alkyl pyridine phase from said system, distilling the predominantly hydrocarbon phase to recover overhead an azeotrope of p-xylene and alkyl pyridine, recycling said azeotropic overhead and said aqueous-alkyl pyridine phase to a vapor generator to supply steam containing an equilibrium proportion of 4-lower alkyl pyridine for the aforesaid vapor stripping step.

16. A process as defined in claim 15 wherein said selective removal of p-xylene-lean mixture is accomplished by solvent washing.

17. A process as defined in claim 15 wherein said selective removal of p-xylene-lean mixture is accomplished by a preliminary stripping with steam containing approximately an equilibrium ratio of said 4-lower alkyl pyridine, and wherein the gaseous effluent from said preliminary stripping is condensed to form a bi-phase liquid system, and the resulting aqueous-alkyl pyridine phase is separated from said system and recycled to said vapor generator to provide steam-alkyl pyridine vapors for at least one of said stripping operations.

References Cited in the file of this patent

UNITED STATES PATENTS

| | | |
|---|---|---|
| 2,395,491 | Mavity | Feb. 26, 1946 |
| 2,499,820 | Fetterly | Mar. 7, 1950 |
| 2,577,202 | Lien et al. | Dec. 4, 1951 |
| 2,596,344 | Newey et al. | May 15, 1952 |
| 2,627,513 | Arey | Feb. 3, 1953 |
| 2,652,435 | Hess et al. | Sept. 15, 1953 |
| 2,686,755 | Hess et al. | Aug. 17, 1954 |
| 2,732,413 | Jones et al. | Jan. 24, 1956 |

OTHER REFERENCES

Halpern: Bull. Acad. Sci. U. R. S. S. Classe sci. math. nat. Ser. chim., 1937, pages 435–41; abstracted in Chem. Abs., col. 31, col. 7350 (1930).

General College Chemistry, Babor et al., Thomas Y. Crowell Co. (New York) (1940), pages 510 and 511.

J. Chem. Soc. (London), 1948, pages 61–73. Article by Powell.

J. Chem. Soc. (London), 1950, page 3346. Article by Evans et al.

J. Chem. Phys. vol. 18 (1950), pages 150–1. Article by Smith.

Rayner et al.: J. Chem. Soc. (London) (1952) (February), pages 319–328, page 325 only needed.